United States Patent
Morgan-Mar et al.

(10) Patent No.: US 9,639,948 B2
(45) Date of Patent: May 2, 2017

(54) MOTION BLUR COMPENSATION FOR DEPTH FROM DEFOCUS

(71) Applicant: CANON KABUSHIKI KAISHA, Tokyo (JP)

(72) Inventors: David Peter Morgan-Mar, Wollstonecraft (AU); Matthew Raphael Arnison, Umina Beach (AU)

(73) Assignee: Canon Kabushiki Kaisha, Tokyo (JP)

(*) Notice: Subject to any disclaimer, the term of this patent is extended or adjusted under 35 U.S.C. 154(b) by 112 days.

(21) Appl. No.: 14/579,745

(22) Filed: Dec. 22, 2014

(65) Prior Publication Data
US 2015/0178935 A1   Jun. 25, 2015

(30) Foreign Application Priority Data
Dec. 23, 2013 (AU) ................................ 2013273843

(51) Int. Cl.
G06K 9/00 (2006.01)
G06T 7/00 (2017.01)

(52) U.S. Cl.
CPC .......... *G06T 7/0071* (2013.01); *G06T 7/0069* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 7,792,386 B1* | 9/2010 | Worthington | G06T 5/20 382/205 |
| 8,159,579 B2* | 4/2012 | Jannard | H04N 5/235 348/222.1 |
| 8,295,629 B2* | 10/2012 | Wey | G06T 5/50 348/229.1 |
| 8,432,434 B2* | 4/2013 | Veeraraghavan | G01B 11/22 345/419 |
| 8,624,986 B2* | 1/2014 | Li | H04N 5/23212 348/208.13 |
| 8,989,517 B2* | 3/2015 | Morgan-Mar | H04N 5/23212 348/207.1 |
| 9,230,306 B2* | 1/2016 | Sun | G06T 5/003 |
| 2011/0229052 A1* | 9/2011 | Li | G06T 5/002 382/264 |

(Continued)

*Primary Examiner* — Iman K Kholdebarin
(74) *Attorney, Agent, or Firm* — Canon USA, Inc. I.P. Division

(57) ABSTRACT

Methods, apparatuses, and computer readable storage media are provided for determining a depth measurement of a scene using an optical blur difference between two images of the scene. Each image is captured using an image capture device with different image capture device parameters. A corresponding image patch is identified from each of the captured images, motion blur being present in each of the image patches. A kernel of the motion blur in each of the image patches is determined. The kernel of the motion blur in at least one images patch is used to generate a difference convolution kernel. A selected first image patch is convolved with the generated difference convolution kernel to generate a modified image patch. A depth measurement of the scene is determined from an optical blur difference between the modified image patch and the remaining image patch.

25 Claims, 11 Drawing Sheets

(56) References Cited

U.S. PATENT DOCUMENTS

| | | | |
|---|---|---|---|
| 2012/0249833 A1* | 10/2012 | Li | H04N 5/23212 348/231.99 |
| 2013/0058588 A1* | 3/2013 | Wang | G06T 5/003 382/255 |
| 2013/0063566 A1* | 3/2013 | Morgan-Mar | G06T 7/0069 348/46 |
| 2013/0121537 A1* | 5/2013 | Monobe | H04N 5/23254 382/106 |
| 2013/0141630 A1* | 6/2013 | Li | G06T 7/0069 348/348 |
| 2013/0142394 A1* | 6/2013 | Li | G06T 7/0069 382/106 |
| 2013/0266210 A1* | 10/2013 | Morgan-Mar | G06T 7/0051 382/154 |
| 2015/0146994 A1* | 5/2015 | Arnison | G06T 7/0069 382/254 |
| 2015/0178935 A1* | 6/2015 | Morgan-Mar | G06T 7/0071 382/154 |
| 2015/0302573 A1* | 10/2015 | Trouve | G02B 27/0075 348/135 |

* cited by examiner

MOTION BLUR COMPENSATION FOR DEPTH FROM DEFOCUS

REFERENCE TO RELATED PATENT APPLICATION(S)

This application claims the benefit under 35 U.S.C. §119 of the filing date of Australian Patent Application No. 2013273843, filed Dec. 23, 2013, hereby incorporated by reference in its entirety as if fully set forth herein.

TECHNICAL FIELD

The present invention relates generally to digital image processing and, in particular, to estimating the distance to an object from a digital image of a scene.

BACKGROUND

In many applications of image capture, the distance from an image capture device to objects within the field of view of the image capture device can be advantageously determined A collection of such distances to objects in an imaged scene is sometimes referred to as a depth map. A depth map of an imaged scene may be represented as an image, which may be of a different pixel resolution to the image of the scene itself, in which the distance to objects corresponding to each pixel of the depth map is represented by a greyscale or colour value.

A depth map can be useful in a number of applications including photography and video capture, as the depth map enables several desirable post-capture image processing capabilities for photographs or video streams. For example, a depth map can be used to segment foreground and background objects in a digital image to allow manual post-processing, or the automated application of creative photographic or video special effects.

Several features are desirable in any method of acquiring a depth map. Depth accuracy is important; otherwise, the resulting depth map may suggest that objects are at distances significantly different to their true distances. Depth resolution is important to allow the separation of objects that may be spatially close to one another in the scene and also to allow for accurate post-processing operations. Spatial resolution of the depth map is also important in many applications, in particular, depth maps approaching the resolution of the images themselves are useful for pixel-wise segmentation and avoiding visually obvious object boundary errors in many post-processing operations. A tolerance to subject or camera motion is highly desirable, especially in video applications where the subjects and the camera are likely to be moving during image capture. Desirably, depth mapping methods can be realised in practical devices, such as cameras, with minimal additional cost, bulk, weight, image capture and processing time, and power consumption.

Several methods are known for determining a depth map from images of a scene. So-called active depth mapping methods involve projecting beams or patterns of light or other radiation onto a scene. Active methods require projection optics, which add significant cost, weight, and power requirements. In addition, active methods have limited range and may add unwanted light to a scene in which the lighting must be carefully controlled for artistic effect.

So-called passive depth mapping methods, in contrast to active methods, rely only on the ambient light in the scene. One method, stereo imaging, uses multiple cameras to determine depth using the stereoscopic effect; this has disadvantages related to multiple viewpoints, equipment cost, difficulty of alignment, and object occlusion. Another method, depth from focus, uses multiple shots from a single camera at many different focus positions; this has the significant disadvantage of requiring a relatively long scan through focus, making this method impractical for video frame rates. Another method, depth from defocus (DFD), uses a small number of images shot at different focus positions and extracts depth information from variation in blur with object distance. Depth from defocus is more practical than other methods for many applications because DFD relies on as few as two images to determine depth.

Several different DFD methods are known. Such DFD methods typically rely on correspondences between regions of pixels in multiple images of the same scene to extract depth information about the object imaged at that image region. These correspondences are interfered with by object motion in two ways: misalignment of an object because the object has moved in between the exposures, and motion blur caused by an object moving with a lateral translational motion during an exposure. Misalignment may be dealt with, more or less successfully, using image alignment methods. Motion blur, however, is a more difficult problem and has only been addressed by a small number of methods.

One method of dealing with motion blur in DFD is to detect regions of the images which show significant motion blur, and discard those detected regions from further consideration. The resulting depth map of the scene may then contain regions where no depth information is provided, which presents a significant disadvantage to any application of the depth data.

Another method of dealing with motion blur in DFD is to develop a model of image formation involving parameters related to defocus blur and motion blur, described by a system of equations. The model may include regularisation assumptions and a cost function to make the problem numerically tractable and be solved in an iterative error minimisation manner to produce depth estimates. Disadvantageously, such a method is computationally expensive and inappropriate for implementation on a portable device or for rapid post-processing workflow.

SUMMARY

In accordance with an aspect of the invention, there is provided a method of determining a depth measurement of a scene using an optical blur difference between two images of the scene. Each image is captured using an image capture device with different image capture device parameters. A corresponding image patch is identified from each of the captured images, motion blur being present in each of the image patches. A kernel of the motion blur in each of the image patches is determined. The kernel of the motion blur in at least one of the images patches is used to generate a (first) difference convolution kernel. A selected first image patch is convolved with the generated difference convolution kernel to generate a modified image patch. A depth measurement of the scene is determined from an optical blur difference between the modified image patch and the remaining image patch.

The method may comprise selecting the first image patch based on the motion blur kernel in the image patch.

The motion blur present in the modified image patch may substantially match the motion blur present in the remaining image patch.

A second difference convolution kernel may be generated, and the remaining image patch may be convolved with the second difference convolution kernel to form another modified image patch. The motion blur present in both modified image patches may be substantially the same. The generated first difference convolution kernel may be equal to the determined motion blur kernel in the remaining image patch. The generated second difference convolution kernel may be equal to the determined motion blur kernel in the selected image patch and is convolved with the remaining image patch to form another modified image patch.

The exposure times of the captured images may be the same.

A second pair of corresponding image patches may be processed differently to the first pair of corresponding image patches.

The selected image patch is determined to have a smaller motion blur kernel than that of the remaining image patch.

The remaining image patch may be determined to have a smaller motion blur kernel than that of the selected image patch.

The method may comprise determining the smaller motion blur kernel by counting the number of samples above an amplitude threshold in Fourier differences. The method may comprise applying a logarithm to the amplitudes of the Fourier differences. The method may comprise weighting the Fourier differences. The method may comprise determining the smaller motion blur kernel by comparing widths of one-dimensional motion blur kernels.

The method may comprise forming a spectral ratio using Fourier differences. The method may further comprise weighting the spectral ratio using a Fourier difference amplitude threshold The method may comprise forming a depth map using the depth measurement.

In accordance with another aspect of the invention, there is provided an apparatus for determining a depth measurement of a scene using an optical blur difference between two images of the scene. Each image is captured using an image capture device with different image capture device parameters. The apparatus comprises: a memory for storing data and a computer program, a processor unit coupled to the memory for executing a computer program, and a computer program. The memory and the processor are configured to determine the depth measurement of the scene using the optical blur difference. The computer program comprising: a computer program code for identifying a corresponding image patch from each of the captured images, motion blur being present in each of the image patches; a computer program code for determining a kernel of the motion blur in each of the image patches, the kernel of the motion blur in at least one of the images patches being used to generate a difference convolution kernel; a computer program code for convolving a selected first image patch with the generated difference convolution kernel to generate a modified image patch; and a computer program code for determining a depth measurement of the scene from an optical blur difference between the modified image patch and the remaining image patch.

In accordance with a further aspect of the invention, there is provided a non-transitory computer readable storage medium having recorded therein a computer program for determining a depth measurement of a scene using an optical blur difference between two images of the scene. Each image is captured using an image capture device with different image capture device parameters. The computer program comprising: a computer program code for identifying a corresponding image patch from each of the captured images, motion blur being present in each of the image patches; a computer program code for determining a kernel of the motion blur in each of the image patches, the kernel of the motion blur in at least one of the images patches being used to generate a difference convolution kernel; a computer program code for convolving a selected first image patch with the generated difference convolution kernel to generate a modified image patch; and a computer program code for determining a depth measurement of the scene from an optical blur difference between the modified image patch and the remaining image patch.

BRIEF DESCRIPTION OF THE DRAWINGS

Embodiments of the invention are described hereinafter with reference to the following drawings, in which.

DETAILED DESCRIPTION INCLUDING BEST MODE

Context

The arrangements presently disclosed may be implemented on a variety of hardware platforms, including in an image capture device such as a camera, or on a general purpose computer (PC), or in a cloud computing implementation.

Figure 1A:
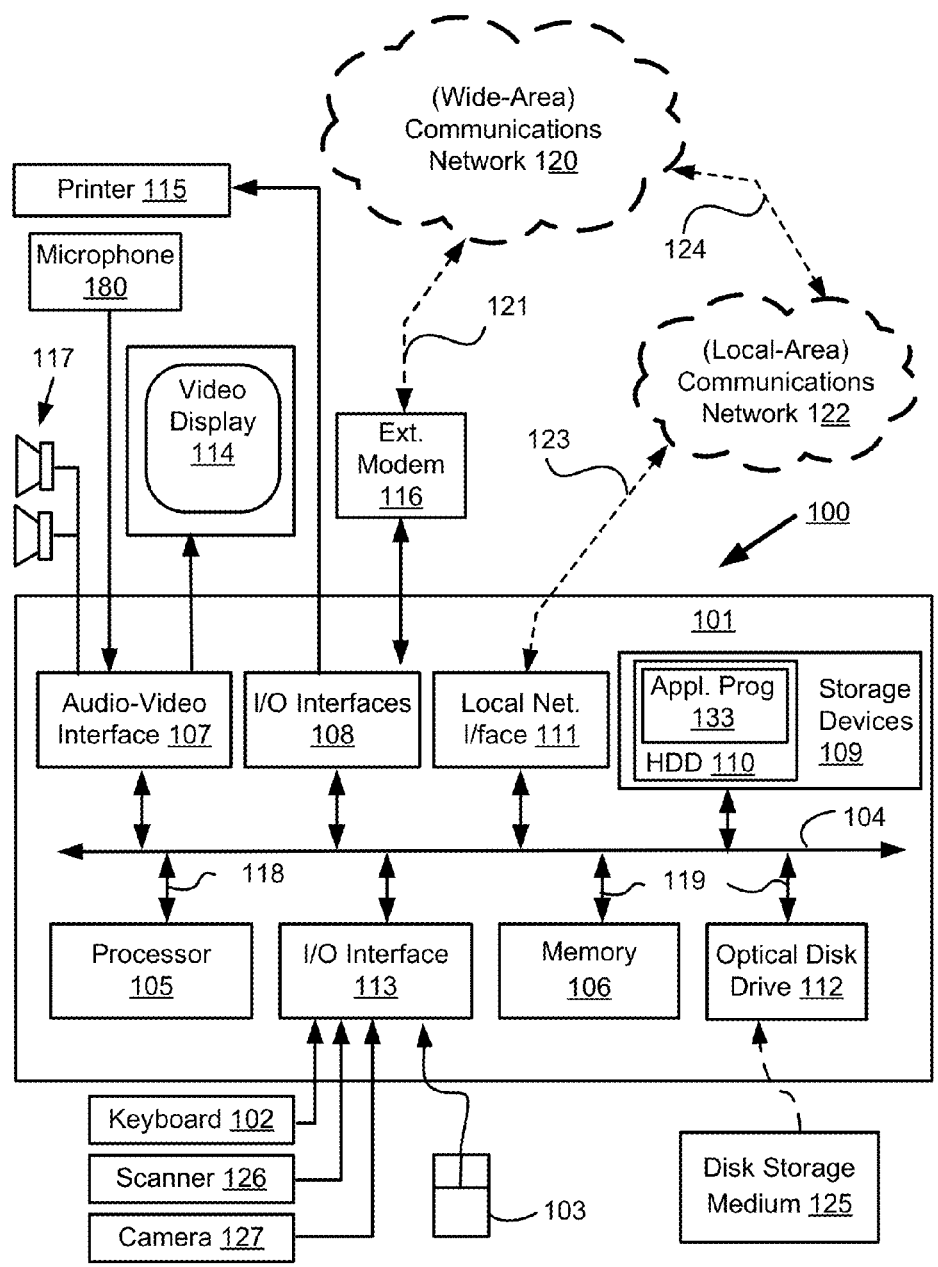
FIGS. 1A-1B are schematic block diagrams of a general purpose computer on which the embodiments of the invention may be practised.
Figure 1B:
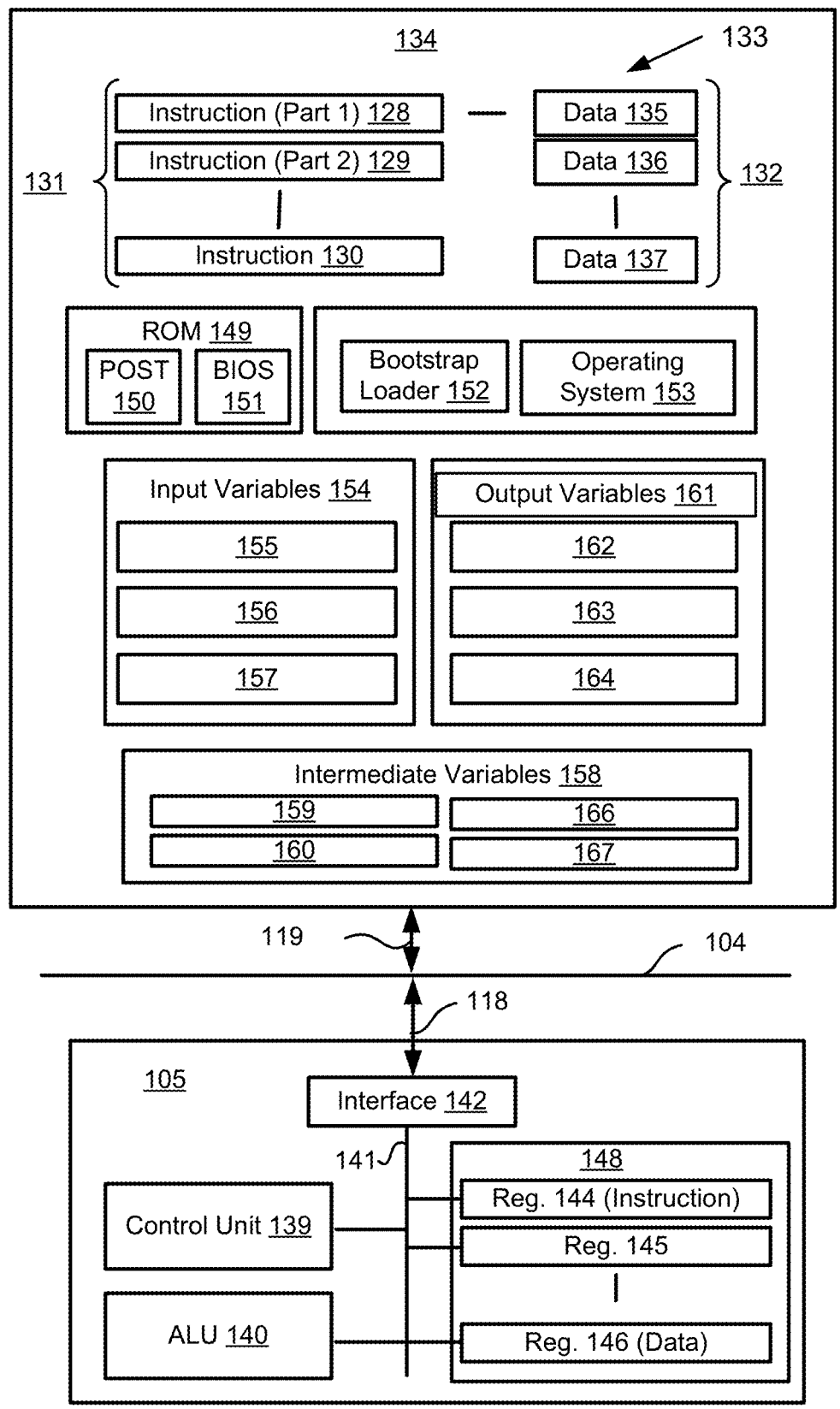

FIGS. 1A and 1B depict a general-purpose computer system 100, upon which the various arrangements described can be practiced. As depicted in FIG. 1A, the computer system 100 includes: a computer module 101; input devices such as a keyboard 102, a mouse pointer device 103, a scanner 126, an image capture device 127 (e.g., a camera or video recorder), and a microphone 180; and output devices including a printer 115, a display device 114, and loudspeakers 117. An external Modulator-Demodulator (Modem) transceiver device 116 may be used by the computer module

101 for communicating to and from a communications network 120 via a connection 121. The communications network 120 may be a wide-area network (WAN), such as the Internet, a cellular telecommunications network, an Intranet, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, the mouse 103, scanner 126, the image capture device 127, and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which typically includes a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

The method of estimating depth of an object from a digital image of a scene may be implemented using the computer system 100. The processes of FIGS. 2 to 10, to be described, may be implemented as one or more software application programs 133 executable within the computer system 100. In particular, the steps of the method of estimating depth of an object from a digital image of a scene are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the methods of estimating depth of an object from a digital image of a scene and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for estimating depth of an object from a digital image of a scene.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for estimating depth of an object from a digital image of a scene.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternatively, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed depth estimating arrangements use input variables 154, which are stored in the memory 134 in corresponding memory locations 155, 156, 157. The depth estimating arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 2 to 10 is associated with one or more segments of the program 133 and is performed by the register section 144, 145, 146, the ALU 140, and the control unit 139 in the processor 105 working together to perform the fetch, decode, and execute cycles for every instruction in the instruction set for the noted segments of the program 133.

The method of estimating depth of an object from a digital image of a scene may alternatively be implemented in dedicated hardware such as one or more integrated circuits performing the functions or sub functions of estimating depth of an object from a digital image of a scene. Such dedicated hardware may include graphic processors, digital signal processors, or one or more microprocessors and associated memories.

The method of estimating or measuring depth incorporating DFD techniques may alternatively be implemented in whole or part in dedicated hardware such as one or more integrated circuits performing the functions or sub functions to be described. Such dedicated hardware may include graphic processors, digital signal processors, or one or more microprocessors and associated memories.

For example, an image capture device (such as a camera) may implement the DFD algorithmic processes to be described in hardware or firmware to capture pairs of images with different parameters of the image capture device and to process the captured images to provide a depth map for various purposes. Such purposes may include artificially blurring the background of portrait photos to achieve a pleasing aesthetic, or attaching depth information as image metadata to enable various post-processing operations. In this case, the hardware of the image capture device can capture multiple images of a scene, the images being suitable for application of the DFD processing, processing occurs in the camera's embedded devices, and results are retained in a memory of the camera, written to a memory card or other memory storage device connectable to the camera, or uploaded to a cloud computing server for later retrieval by the user.

In another example, a desktop computer or the like may implement the DFD processing in software to enable post-capture processing of photos to generate depth estimates, which a user can use for image segmentation or further image processing operations. In this case, the image capture device 127 captures multiple images of a scene in a traditional fashion, the images being suitable for application of the DFD process, and the images are retained in memory or written to a memory card or other memory storage device. At a later time, the images are transferred to the computer (e.g. 101), where subsequent steps of the DFD process use the transferred images as input.

In yet another example, a cloud computing server or the like may implement the DFD processing in software to enable post-capture processing of photos to generate depth estimates. In this case, the image capture device captures multiple images of a scene in a traditional fashion. The images are uploaded to a cloud computing server, where subsequent steps of the DFD process use them as input. The cloud computing server produces the depth maps and possibly additionally processed images and may then download them back to the image capture device, or store them for later retrieval by the user.

Other implementations may capture two or more images with different image capture device parameters, the varying parameters being one or more of: focus, zoom, aperture, or any other image capture device setting that influences the amount of blur in the captured image. In the case of some parameters, such as zoom in particular but also focus and potentially other parameters, the magnification of the captured images may be different. In this case one or more of the images may be scaled to bring the images substantially into registration before applying the DFD algorithm to determine a depth map.

Overview

A method of determining a depth measurement from two images of the same scene can be developed from the theory of image formation. This is done using an optical blur difference. The images are captured using an image capture device, such as a camera. Consider a patch $f_0$ of the scene to be imaged, the patch being small enough such that any variation in object depth or point spread function (PSF) of the imaging system within the patch is small and thus can be ignored. The two-dimensional intensity distribution of the corresponding patch of an image $f_1$ 340 of the intensity distribution of the scene patch $f_0$ can be modelled using a fully general PSF by a spatial convolution operation as follows:

$$f_1(x,y) = f_0(x,y) \otimes PSF_1(x,y), \quad (1)$$

where $PSF_1$ is the defocus blur PSF of the scene patch $f_0$ when the scene patch is projected on to the image patch $f_1$ 340 by the optics of the image capture device (e.g., a camera). Taking the Fourier transform of both sides of Equation (1) gives:

$$F_1(u,v) = F_0(u,v) OTF_1(u,v), \quad (2)$$

where (u, v) are spatial frequency coordinates, $F_1$ is the Fourier transform of $f_1$, $F_0$ is the Fourier transform of $f_0$, and $OTF_1$ is the Fourier transform of $PSF_1$. By the Fourier convolution theorem the spatial convolution operation has become a product. The function $OTF_1$ is known as the optical transfer function (OTF). The OTF is a complex-valued function, with modulus and phase components.

Assume two images of the same scene are captured with different camera parameters, but without moving the image capture device or any objects in the scene so that the images are in alignment with one another. The image capture device parameters that may be varied include, but are not limited to, focus, aperture, or zoom, any of which may vary the OTF of the image capture device. The relationship between the images patches in the two images is illustrated in FIG. 3.

Figures 3A, 3B:
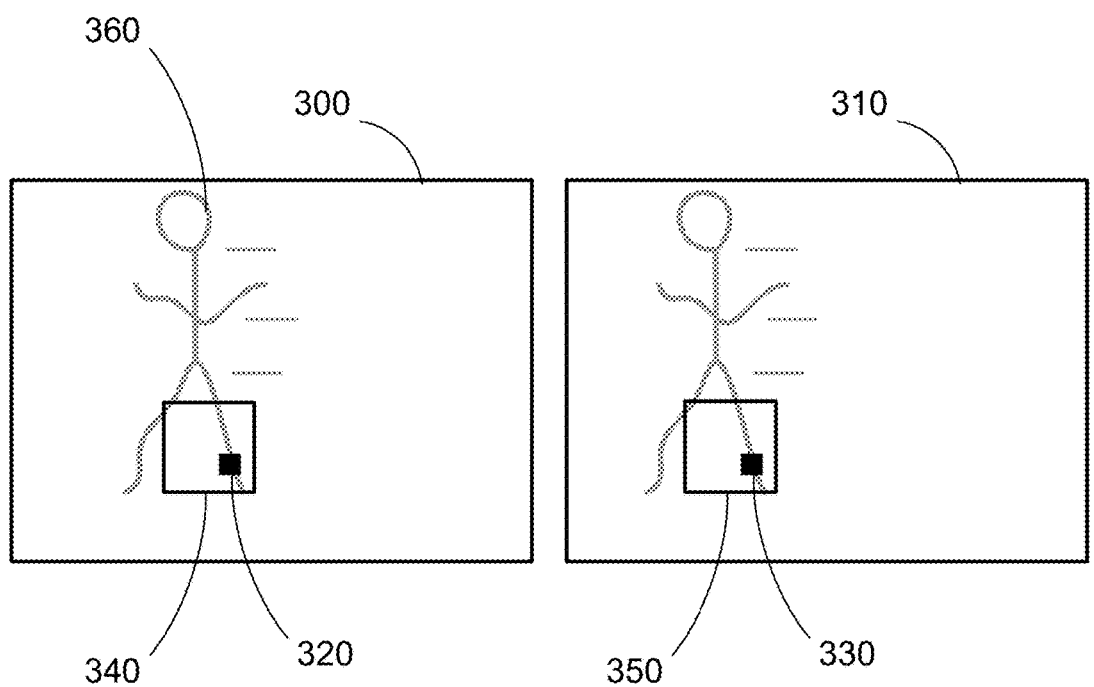
FIGS. 3A-3B are diagrams illustrating the correspondence between pixels and image patches within a first image (see FIG. 3A) and a second image (see FIG. 3B) of a scene.

FIGS. 3A-3B illustrate a first image 300 of the scene and a second image 310 of the same scene, respectively. The scene contains a moving object 360. A selected pixel 320 in the first image 300 (see FIG. 3A) is highlighted and a corresponding selected pixel 330 in the second image 310 (see FIG. 3B) is highlighted. The correspondence is such that the selected pixel 320 in the first image 300 and the selected pixel 330 in the second image 310 largely correspond to the same point on an object 360 in the scene being imaged. The first image patch 340 is from the first image 300 and is referred to as $f_1$. The second image patch 350 is from the second image 310 and is referred to as $f_2$. Thus, corresponding image patches 340 and 350 are identified from the captured images 300 and 310. The patches should be the same size to ensure appropriate comparison of image content contained therein, and contain the selected pixels 320 and 330 at corresponding pixel coordinates within the patches.

The second image patch $f_2$ 350 of the same scene patch $f_0$ may be modelled in the same way as Equation (1), replacing the 1 subscripts with 2 subscripts. Taking the ratio of the Fourier transforms of corresponding patches in the two images gives $$\frac{F_1(u,v)}{F_2(u,v)} = \frac{OTF_1(u,v)}{OTF_2(u,v)}, \quad (3)$$

where the Fourier transform $F_0(u, v)$ of the scene is common to the numerator and denominator of the right hand side and has been cancelled from the ratio. This ratio may be called the spectral ratio. When no noise is present, the spectral ratio is scene independent because all contributions of the scene have been cancelled out. In the presence of imaging or quantisation noise, the cancellation may not be perfect, and the spectral ratio may be biased by the noise. It can be shown that the shape of the spectral ratio depends on the camera parameters used to capture each image, and the distance of the imaged object from the image capture device, also known as the depth of the object. Thus, the depth of an object can be estimated from the spectral ratio.

In an alternative case, where the image capture device or objects in the scene or both may be moving, the situation is more complex. Firstly, the images may need to be locally aligned to allow the extraction of image patches depicting corresponding parts of the same object. Methods are known for performing such alignment, for example optical flow or correlation based alignment methods. Secondly, following such alignment, the image patches may exhibit different amounts of motion blur caused by the object 360 or image capture device moving with a lateral translational motion during each exposure. In general, image patch $f_1$ 340 is formed by convolution with a motion blur kernel $b_1$, so that Equation (1) becomes:

$$f_1(x,y) = f_0(x,y) \otimes PSF_1(x,y) \otimes b_1(x,y). \quad (4)$$

Image patch $f_2$ 350 are similarly convolved with a motion blur kernel $b_2$. Assuming the patches have been aligned, the spectral ratio becomes:

$$\frac{F_1(u, v)}{F_2(u, v)} = \frac{OTF_1(u, v)B_1(u, v)}{OTF_2(u, v)B_2(u, v)}, \quad (5)$$

where $B_1$ and $B_2$ are the Fourier transforms of the motion blur kernels $b_1$ and $b_2$, respectively. If the motion blur kernels $b_1$ and $b_2$ are the same, then their Fourier transforms cancel (where the blur kernels are non-zero), leaving the original spectral ratio. In practice, the presence of imaging noise means that the signal-to-noise ratio of the spectral ratio decreases in the presence of motion blur, making depth estimates based on the spectral ratio less reliable. Alternatively, if the motion blur kernels $b_1$ and $b_2$ are different, then their Fourier transforms do not cancel and the spectral ratio is distorted. A depth estimate made from the distorted spectral ratio without taking into account the distortion is biased and unreliable.

Other methods of estimating depth from two image patches exist, which do not make explicit use of the spectral ratio. However, all depend at least implicitly on properties of the OTFs, in particular changes in the OTF with changes in focus, and in each case the modifications of the images caused by different motion blur kernels biases the resulting depth estimate.

The embodiments of the present invention aim to ameliorate the distortion of the spectral ratio when motion blur is present and to provide a method of estimating an unbiased depth from two image patches of the same part of a scene but containing different motion blurs.

Assume we have two image patches $f_1$ 340 and $f_2$ 350, suitably aligned to show corresponding regions of a scene. Assume that the motion blur kernels of each image patch are also known. In practice the motion blur kernels of the patches may be estimated from the images using known methods. Some example methods of estimating motion blur kernels include various blind deconvolution algorithms, cepstral analysis, radon transform methods, using steerable image filters, and spectral analysis of image gradients.

A convolution kernel $k_{12}$ can be formed by taking the inverse Fourier transform of the ratio $B_2/B_1$, and similarly a convolution kernel $k_{21}$ by taking the inverse Fourier transform of the ratio $B_1/B_2$. The modified spectral ratios can be formed, as follows:

$$\frac{F_1(u, v)K_{12}(u, v)}{F_2(u, v)} = \quad (6)$$
$$\frac{OTF_1(u, v)B_1(u, v)K_{12}(u, v)}{OTF_2(u, v)B_2(u, v)} = \frac{OTF_1(u, v)B_2(u, v)}{OTF_2(u, v)B_2(u, v)},$$

$$\frac{F_1(u, v)}{F_2(u, v)K_{21}(u, v)} = \quad (7)$$
$$\frac{OTF_1(u, v)B_1(u, v)}{OTF_2(u, v)B_2(u, v)K_{21}(u, v)} = \frac{OTF_1(u, v)B_1(u, v)}{OTF_2(u, v)B_1(u, v)},$$

where $K_{12}$ and $K_{21}$ are the Fourier transforms of $k_{12}$ and $k_{21}$ respectively. In each case the motion blur present in one of the image patches has effectively been modified to match the motion blur in the other image patch. The motion blurs may be cancelled out of the modified spectral ratios (where the motion blurs are non-zero). This removes at least some of the distortion to the spectral ratio caused by the motion blurs, and resulting depth estimates based on the modified spectral ratios is less biased.

In practice, imaging noise is a serious issue. Estimating a depth from two image patches with typical amounts of imaging noise is a difficult problem. The difficulty is typically increased when the patches are modified, because many modifications reduce signal-to-noise ratio. In particular, dividing sample values in the Fourier domain by noisy near-zero values can amplify noise relative to any signal. Furthermore, in general any manipulation of the amounts of motion blur to cancel the motion blur from the spectral ratio requires multiplying some sample values in the Fourier domain by large numbers.

To minimise the resulting amplification of noise, the particular modification is selected that produces the least significant disruption to the estimation of a depth from the spectral ratio. This is achieved by comparing the Fourier domain kernels $K_{12}$ and $K_{21}$, and selecting one according to criteria designed to minimise the effect of the noise amplification.

The details of embodiments of the invention are given hereinafter.

Embodiment 1

Figure 2:
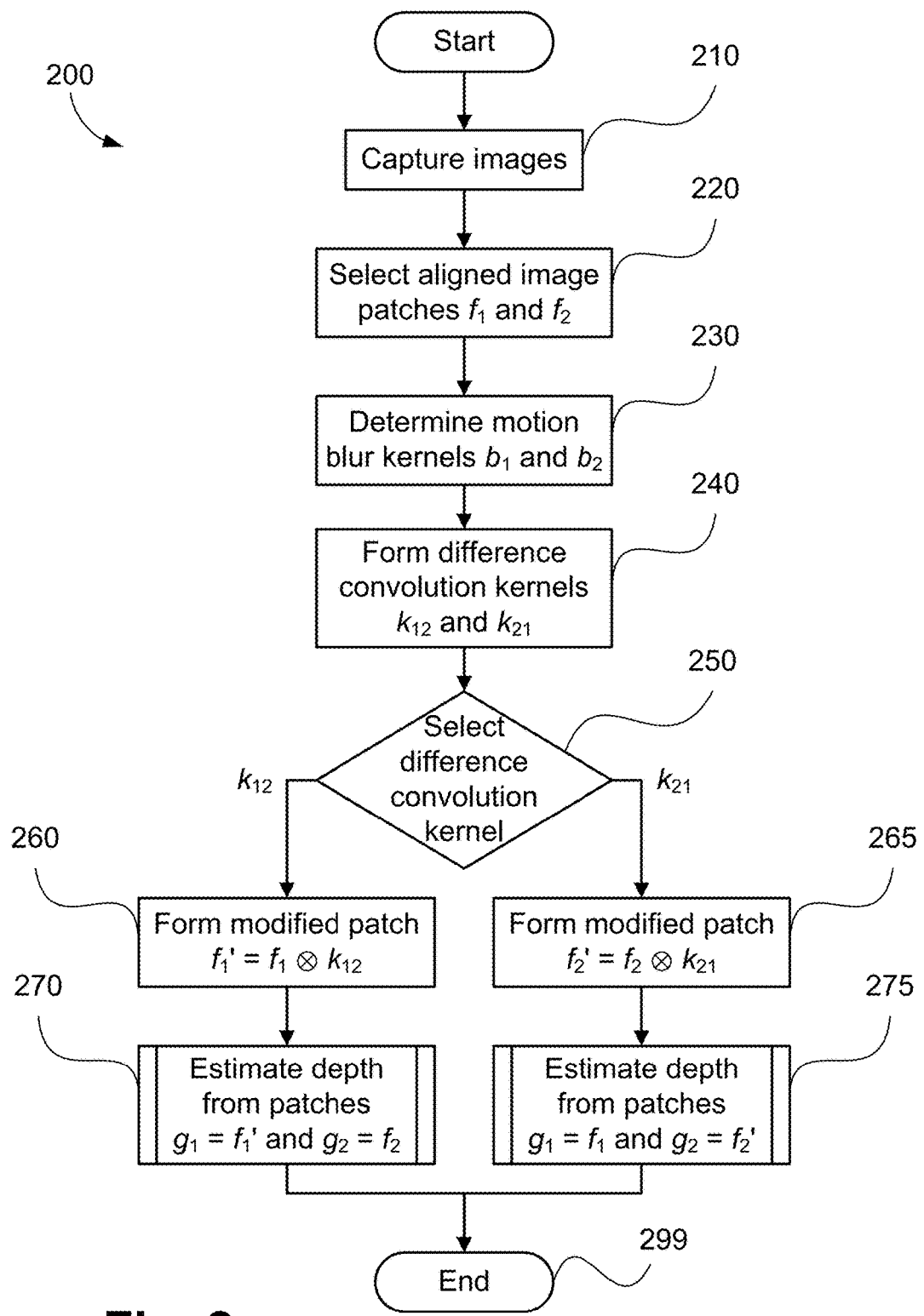
FIG. 2 is a schematic flow diagram illustrating a method of estimating depth of an object from a digital image of a scene according to one embodiment of the invention.

An embodiment of the invention is described with reference to FIG. 2. FIG. 2 illustrates a method 200 of estimating the depth of an object from a digital image of a scene. A depth measurement of a scene is determined using an optical blur difference between two images of the scene, and each image is captured with different parameters of the image capture device. The depth estimation process 200 begins with an image capture step 210, in which two or more images of a scene are captured by an image capture device, such as the image capture device 127. From the two or more images, two images 300 and 310 are selected. The images 300 and 310 preferentially capture common parts of the scene. The images 300 and 310 preferentially are captured with different settings of image capture device parameters that affect the amount of lens blur, such as focus, aperture, or zoom.

In a patch selection step 220, image patches $f_1$ 340 and $f_2$ 350 are selected, or identified, from the two images 300 and 310 such that corresponding pixels 320 and 330 in the image patches 340 and 350 respectively substantially represent the same point in the scene being imaged. This may be achieved by locally aligning the two images using a method such as optical flow or correlation-based alignment.

In a motion blur kernel determination step 230, the motion blur kernels $b_1$ and $b_2$ present in the image patches $f_1$ 340 and $f_2$ 350, respectively, are determined. This may be done using an image-based motion blur estimation algorithm, operating on each of the images 300 and 310. Several such methods are known, as mentioned above. Alternatively, at least part of the motion blur may be estimated from known motion of the image capture device, such as in panning or tracking shots where the image capture device motion is recorded or computer-controlled. Alternatively, at least part of the motion blur may be estimated from a series of image frames, from which the speed and direction of motion of objects in the scene can be determined using optical flow and used to predict motion blur of an object.

In a difference convolution forming (generating) step 240, the difference convolution kernels $k_{12}$ and $k_{21}$ are formed according to:

$$k_{12}(x, y) = IFT\left(\frac{FT(b_2(x, y))}{FT(b_1(x, y))}\right) \quad (8)$$

and $$k_{21}(x, y) = IFT\left(\frac{FT(b_1(x, y))}{FT(b_2(x, y))}\right), \quad (9)$$

where FT is the Fourier transform operator and IFT is the inverse Fourier transform operator. The Fourier transform may be implemented as a discrete Fourier transform on the pixel values of the motion blur kernels sampled on a pixel grid of the same spacing as the image patches.

In a difference convolution selection step 250, one of the difference convolution kernels $k_{12}$ and $k_{21}$ is selected. The selection is made based on a determination of which of the kernels tends to increase the noise in an image by less than the other when convolved with a noisy image. One method of making such a determination is described in detail below with reference to FIG. 4. Other methods of making this determination may be practiced without departing from the scope of the invention. If the kernel $k_{12}$ is selected, processing continues to a first patch modification step 260. If kernel $k_{21}$ is selected, processing continues to a second patch modification step 265.

In a first patch modification step 260, a modified patch $f_1'$ is formed by convolving patch $f_1$ 340 with kernel $k_{12}$. In a first depth estimation step 270, a depth is estimated from the modified patch $f_1'$ and the patch $f_2$ 350. One method of estimating depth from the patches is described in detail below with reference to FIG. 5. The depth estimation process 200 then ends at an end step 299.

In a second patch modification step 265, a modified patch $f_2'$ is formed by convolving patch $f_2$ 350 with kernel $k_{21}$. In a second depth estimation step 275, a depth is estimated from the patch $f_1$ 340 and the modified patch $f_2'$. A method similar to that used for first depth estimation step 270 may be used, substituting the patches $f_1$ and $f_2'$ for the patches $f_1'$ and $f_2$. The depth estimation process 200 then ends at an end step 299.

Figure 4:
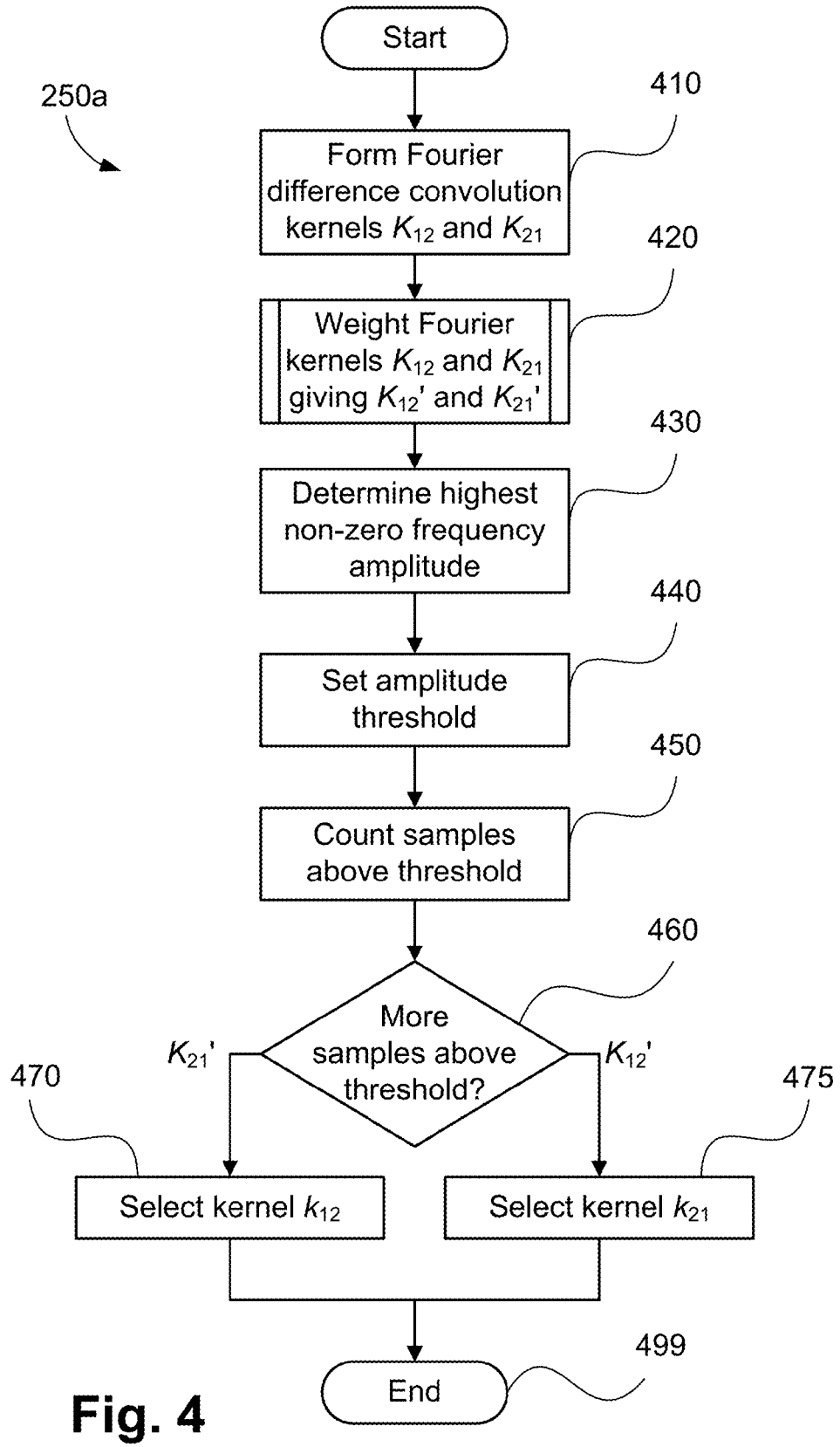
FIG. 4 is a schematic flow diagram illustrating a method of selecting a difference convolution kernel as used in the method of FIG. 2.

One embodiment of difference convolution selection step 250 is now described with reference to FIG. 4, which illustrates a difference convolution selection process 250a. An alternative embodiment is described below under the heading "Embodiment 4".

In a Fourier difference convolution forming step 410, the Fourier difference correlation kernels $K_{12}$ and $K_{21}$ are formed by taking the Fourier transforms of the difference convolution kernels $k_{12}$ and $k_{21}$ respectively. In an alternative embodiment, the Fourier differences $K_{12}$ and $K_{21}$ may be formed directly from the blur kernels $b_1$ and $b_2$ by taking the ratios of the Fourier transforms of the blur kernels $b_1$ and $b_2$, as implied by Equations (8) and (9) where the inverse Fourier transforms are not applied. In an alternative embodiment of Fourier difference forming step 410, the amplitudes of the Fourier differences $K_{12}$ and $K_{21}$ are modified by taking the logarithm of the amplitude at each sample.

In a kernel weighting step 420, the Fourier differences $K_{12}$ and $K_{21}$ are modified by multiplying by a weighting function, to give modified Fourier kernels $K_{12}'$ and $K_{21}'$ respectively. The kernel weighting step 420 is applied to adjust the results of the sample counting step 450 for the expected signal-to-noise ratio at each spatial frequency sample. In the present embodiment, the weighting function is unity, such that $K_{12}'=K_{12}$ and $K_{21}'=K_{21}$. One or more alternative embodiments of the kernel weighting step 420 are described below.

In an amplitude determining step 430, the amplitude $A_0$ of the highest amplitude non-zero frequency sample in either of the Fourier differences $K_{12}'$ and $K_{21}'$ is determined To do this, the samples in $K_{12}'$ and $K_{21}'$ corresponding to zero spatial frequency are disregarded, and the highest amplitude sample remaining in either $K_{12}'$ or $K_{21}'$ is selected. The amplitude of this sample is designated $A_0$. In the case where multiple samples have equally high amplitudes, the amplitude $A_0$ of the highest amplitude non-zero frequency samples is still uniquely determined.

In an amplitude threshold setting step 440, an amplitude threshold A is set by multiplying the amplitude $A_0$ by a predetermined fraction r. The fraction r is preferentially 0.05, but other values may be used, for example 0.02 or 0.10.

In a sample counting step 450, the number of samples in each of $K_{12}'$ and $K_{21}'$ which have amplitudes greater than the threshold $rA_0$ are counted separately.

In a sample decision step 460, the number of samples in $K_{12}'$ that have amplitudes greater than the threshold $rA_0$ is compared to the number of samples in $K_{21}'$ that have amplitudes greater than the threshold $rA_0$. If $K_{21}'$ has more samples with amplitudes above the threshold $rA_0$ than $K_{12}'$ has, processing continues with first kernel selection step 470. If on the other hand $K_{12}'$ has more samples with amplitudes above the threshold $rA_0$ than $K_{21}'$ has, processing continues with second kernel selection step 475. In the case that $K_{12}'$ and $K_{21}'$ have the same number of samples with amplitudes above the threshold $rA_0$, then processing may continue with either step 470 or 475; for example, the determination may be made randomly, or be predetermined that in this case processing always continues with step 470, or always with step 475.

In a first kernel selection step 470, the difference convolution kernel $k_{12}$ is selected. The difference convolution selection process 250a then ends in end step 499. In a second kernel selection step 475, the difference convolution kernel $k_{21}$ is selected. The difference convolution selection process 250a then ends in end step 499.

Figure 5:
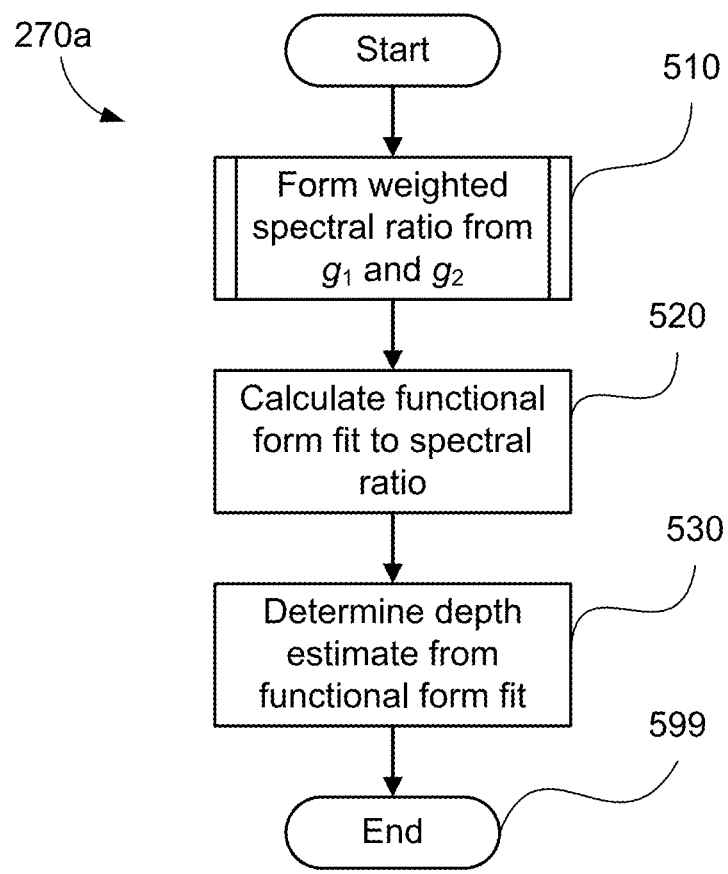
FIG. 5 is a schematic flow diagram illustrating a method of estimating depth from two image patches as used in the method of FIG. 2 according to one embodiment of the invention.

One embodiment of first depth estimation step 270 is now described with reference to FIG. 5. The depth estimation process 270a begins with an input patch $g_1$ and an input patch $g_2$ as data inputs. In the case where the depth estimation process 270a implements the first depth estimation step 270, $g_1$ is equal to the modified patch $f_1'$ and $g_2$ is equal to the image patch $f_2$ 350. The depth estimation process 270a may also implement the second depth estimation step 275, in which case $g_1$ is equal to the image patch $f_1$ 340 and $g_2$ is equal to the modified patch $f_2'$.

In a weighted spectral ratio forming step 510, a weighted spectral ratio is formed from the input patches $g_1$ and $g_2$. One embodiment of weighted spectral ratio forming step 510 is described below with reference to FIG. 8.

In a functional form fitting step 520, a two-dimensional function is fitted to the pixels of the weighted spectral ratio, taking account of the weights assigned in weighted spectral ratio forming step 510. Many such weighted fitting methods are known, one example being a weighted least squares fit. The functional form of the two-dimensional function is preferably one with a single parameter to be determined, for example a paraboloid of the form $1+a(x^2+y^2)$, where a is the parameter to be determined Other functional forms may be used, for example Gaussian functions such as $\exp(-a(x^2+y^2))$.

In a depth determination step 530, the functional form fit parameter or parameters calculated in functional form fitting step 520, combined with the determination of which patch is less blurred as determined in asymmetric patch selection step 850, are used to determine a depth estimate for the input patches $g_1$ and $g_2$, which are derived as described above from image patches $f_1$ 340 and $f_2$ 350. This depth estimation can be done using the set of camera parameters used to capture the images and either using a theoretical model relating the functional form fit parameter or parameters to the depth of the object 360 in the scene shown in the image patches for the camera parameters, or by reference to a calibration look-up table which lists depth versus functional form fit parameter or parameters for the camera parameters. The calibration look-up table may be assembled using either theoretical or experimental results. For example, a theoretical calibration can be compiled by simulating the OTF for a range of object distances and camera parameters, calculating the resulting functional form fit parameter or parameters for a range of object distances and camera parameters, and storing the simulated functional form fit parameter or parameters in a look-up table. Then the closest match between the look-up table values and the functional form fit parameter or parameters calculated from two image patches can be used as an estimate of the depth to the object 360 shown in the image patches.

In another example of depth determination step 530, an experimental calibration can be compiled by placing an object at a range of different distances from a camera, taking two photos of the object at each position with different camera parameters, calculating the functional form fit parameter or parameters of image patches showing the object, and storing the functional form fit parameters in a look-up table referenced by distance to the object.

The depth estimation process 270a then ends at end step 599.

Figure 8:
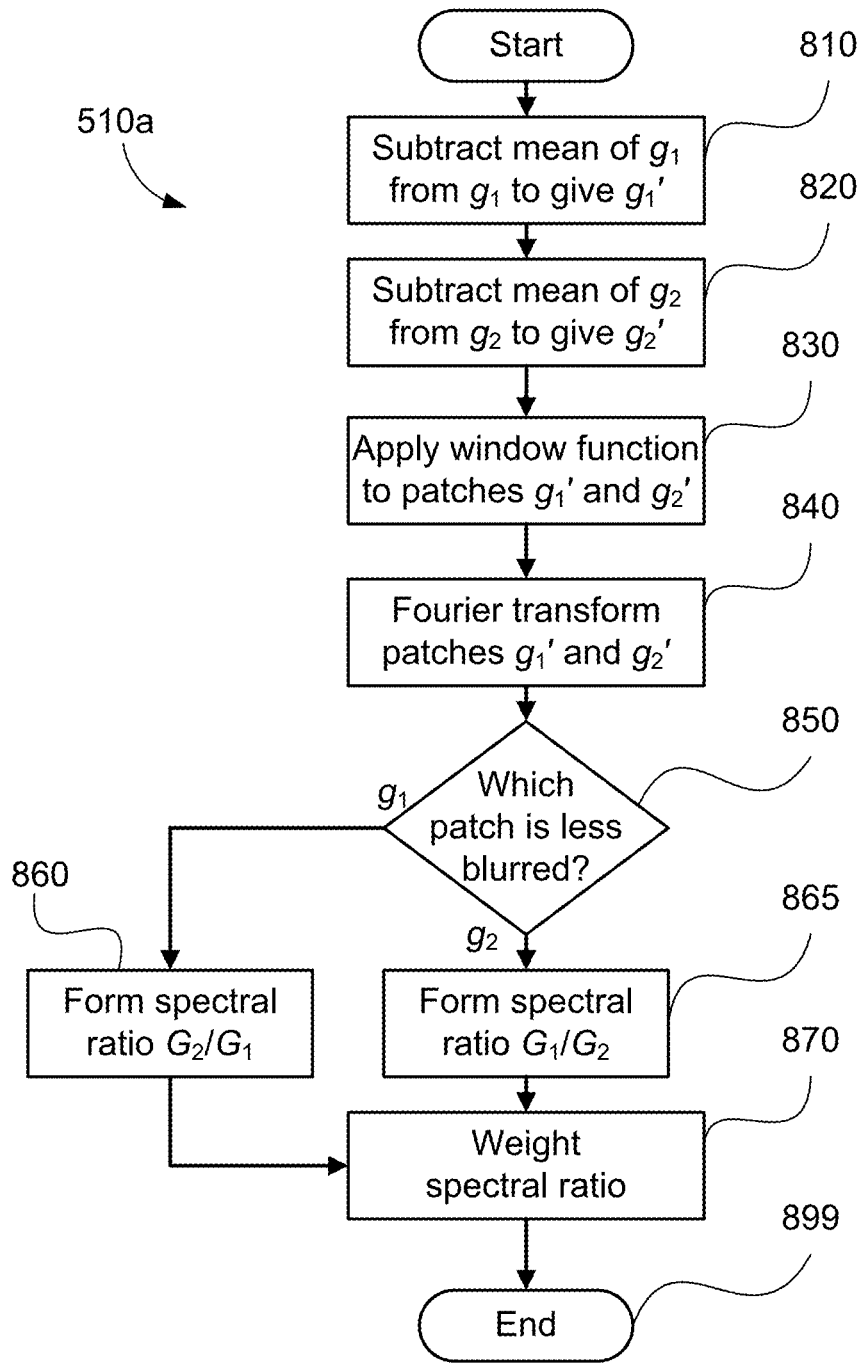
FIG. 8 is a schematic flow diagram illustrating a method of forming a weighted spectral ratio as used in the method of FIG. 5 and in the method of FIG. 7.

One embodiment of weighted spectral ratio forming step 510 is now described with reference to FIG. 8. The weighted spectral ratio forming process 510a begins with an input patch $g_1$ and an input patch $g_2$ as data inputs, as defined by earlier processing steps.

In a first zero mean step 810, the mean value of the pixel values in the first input patch $g_1$ is calculated, and this mean value is then subtracted from the pixel values of all of the pixels in the first input patch $g_1$. The result of this calculation is a first zero mean patch, designated $g_1'$. In a second zero mean step 820, the mean value of the pixel values in the second input patch $g_2$ is calculated, and this mean value is then subtracted from the pixel values of all of the pixels in the second input patch $g_2$. The result of this calculation is a second zero mean patch, designated $g_2'$.

In a windowing step 830, the zero mean patches $g_1'$ and $g_2'$ are windowed using a window function that falls to zero or some small value near the edges of the patches. Example window functions include Hann windows, Hamming windows, and similar functions.

A Fourier transform step 840 follows in which the windowed patches $g_1'$ and $g_2'$ are Fourier transformed, for example using a Fast Fourier Transform (FFT) algorithm, to form Fourier transformed image patches $G_1$ and $G_2$ respectively. The Fourier transformed image patches $G_1$ and $G_2$ contain complex number values at each spatial frequency sample.

A blur determination step 850 follows where one of the input patches $g_1$ or $g_2$ is selected as a less blurred patch. This selection may be performed, for example, by calculating the standard deviations of the pixel values in each of the input patches $g_1$ or $g_2$ respectively and then comparing the standard deviations. The image patch $g_1$ or $g_2$ which has the higher standard deviation may then be selected as the less blurred patch; in the case where the standard deviations are equal, either may be selected. If the image patch $g_1$ is selected as the less blurred patch, the depth estimation process 270a continues to a first spectral ratio step 860. On the other hand, if the image patch $g_2$ is selected as the less blurred patch, the depth estimation process 270a continues to a second spectral ratio step 865.

In the first spectral ratio step 860, the Fourier transformed patches $G_1$ and $G_2$ are divided sample-wise to form the spectral ratio image patch $G_2/G_1$, using complex number division. In the second spectral ratio step 865, the Fourier transformed patches $G_1$ and $G_2$ are divided sample-wise to form the spectral ratio image patch $G_1/G_2$, using complex number division. In both of the spectral ratio steps 860 and 865, the DC spatial frequency sample in the spectral ratio is a special case and is set to unity. In both of the spectral ratio steps 860 and 865, the Fourier transformed patch in the denominator of the formed ratio is the Fourier transformed patch of the image patch determined to be the least blurred in blur determination step 850.

A weighting step 870 is then performed, where the spatial frequency samples in the spectral ratio are assigned weights. The spectral ratio weights are numbers, typically in the range 0 to 1, assigned so that each sample has its own weight. One method of weighting the samples in the spectral ratio is to assign a weight of 1 to samples where the phase of the spectral ratio is less than a predetermined threshold $\epsilon$ and a weight of 0 to samples where the phase of the spectral ratio is greater than or equal to the predetermined threshold $\epsilon$. The effect of such a weighting is to reduce the weight of samples with a low signal-to-noise ratio relative to samples with high signal-to-noise-ratio.

Other methods of weighting the samples of the spectral ratio may also be used. For example, the samples may be assigned a weight of 0 if their spatial frequency falls outside the spatial frequency support cut-off of the camera aperture. In another example, the samples may be weighted based on a function of their spatial frequency, such as a Gaussian function, assigned high weights to lower spatial frequencies and low weights to higher spatial frequencies. In another example, the samples may be assigned a weight of 0 if their spatial frequency corresponds to spatial frequencies at which the Fourier difference kernel $K_{12}$ or $K_{21}$ contains samples with amplitudes above the threshold $rA_0$, as described in sample counting step 450. Other weighting methods may combine one or more aspects or variations of all of these weighting methods.

The weighted spectral ratio forming process 510a ends at end step 899.

In practice, some steps of the above processes may be performed essentially simultaneously in a mathematically equivalent manner, resulting in some intermediate products only notionally being formed. For example, the modified patch $f_1'$ formed in first patch modification step 260 may not actually be formed as a discrete entity; rather the first patch modification step 260 may be combined with later steps of the process in a mathematically equivalent manner, thus producing the same output while obviating the need to calculate intermediate values associated with the modified patch $f_1'$. The above step-by-step description is illustrative only and mathematically equivalent processes producing identical results are within the scope of the invention.

Embodiment 2

Figure 6:
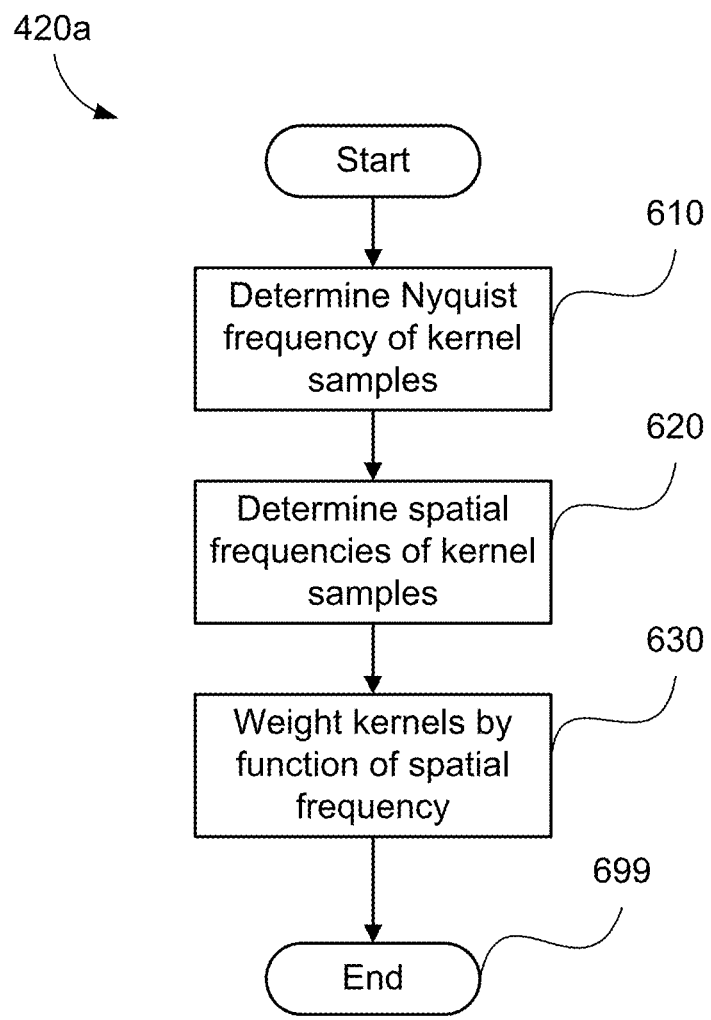
FIG. 6 is a schematic flow diagram illustrating a method of weighting blur difference kernels as used in the method of FIG. 4 according to one embodiment of the invention.

An alternative embodiment of kernel weighting step 420 is now described with reference to FIG. 6, which illustrates a kernel weighting process 420a. The kernel weighting process 420a begins with the Fourier differences $K_{12}$ and $K_{21}$ as inputs.

In a Nyquist frequency determining step 610, the Nyquist frequency $q_N$ of the Fourier differences $K_{12}$ and $K_{21}$ is determined. This may be done, for example, by reference to the pixel pitch of the sensor of the image capture device. The Nyquist frequency is equal to half the spatial frequency of the pixel pitch of the camera sensor.

In a spatial frequency determining step 620, the spatial frequencies $q=\sqrt{u^2+v^2}$ of all of the samples in the Fourier differences $K_{12}$ and $K_{21}$ are determined Typically, the spatial frequencies of the Fourier domain samples are determinable from the Nyquist frequency $q_N$ and the number of pixels in the image patches $f_1$ and $f_2$ using known mathematical relationships.

In a kernel weighting function step 630, the Fourier differences $K_{12}$ and $K_{21}$ are weighted using a function of the spatial frequencies of the kernel samples determined in spatial frequency determining step 620. Preferentially the function is one that reduces the amplitude of low and high frequencies relative to mid-frequencies, the goal being to de-emphasise the relative importance of the lowest and highest spatial frequencies in the kernels. An example function is given by:

$$K'_{12}(u, v) = K_{12}(u, v)\frac{q}{pq_N}\exp\left(-\left(\frac{q}{pq_N}\right)^2\right), \quad (10)$$

where p is a positive real-valued parameter. An example value of p is 0.5, though other values are possible, for example 0.3 or 0.6.

In alternative embodiments, other functions of spatial frequency may be used in kernel weighting function step 630. For example, a function may weight all spatial frequency samples above the spatial frequency cut-off of the camera aperture to zero.

The kernel weighting process 420a ends at end step 699.

Embodiment 3

Figure 7:
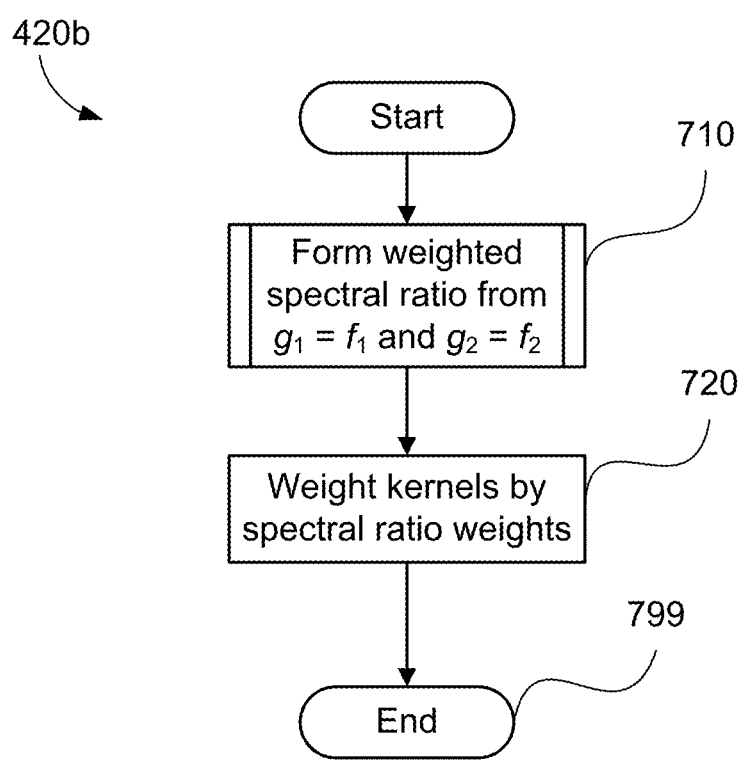
FIG. 7 is a schematic flow diagram illustrating a method of weighting blur difference kernels as used in the method of FIG. 4 according to a further embodiment of the invention.

An alternative embodiment of kernel weighting step 420 is now described with reference to FIG. 7, which illustrates a kernel weighting process 420b. The kernel weighting process 420b begins with the image patches $f_1$ 340 and $f_2$ 350 and the Fourier differences $K_{12}$ and $K_{21}$ as inputs.

In a weighted spectral ratio forming step 710, a weighted spectral ratio is formed from the input image patches $f_1$ 340 and $f_2$ 350. One embodiment of weighted spectral ratio forming step 710 is described above with reference to FIG. 8, in which the inputs $g_1$ and $g_2$ are set equal to the input image patches $f_1$ 340 and $f_2$ 350 respectively.

In a kernel weighting step 720, the Fourier differences $K_{12}$ and $K_{21}$ are weighted using the corresponding spectral ratio weights determined in step 870. The kernel weighting process 420b ends at end step 799.

Further alternative embodiments of kernel weighting step 420 can be practiced without departing from the scope of the invention.

Embodiment 4

An alternative embodiment of difference convolution selection step 250 is described.

In some cases, the motion blur kernels $b_1$ and $b_2$ may be describable in simple terms, for example, if the motion blurs are in a straight line and thus characterisable by one-dimensional kernels, such as one-dimensional box-filters or some other one-dimensional kernels with well-defined widths such as a Gaussians with a measurable standard deviation. If the motion blur kernels $b_1$ and $b_2$ can be characterised in this way, the width parameters of the one-dimensional motion blur kernels can be compared and the kernel with the smaller width can be selected as the kernel corresponding to a smaller amount of motion blur.

In this case, it is not necessary to form both difference convolution kernels $k_{12}$ and $k_{21}$ in difference convolution forming step 240. Instead, difference convolution selection step 250 can be implemented as follows: if motion blur kernel $b_1$ corresponds to a smaller amount of motion blur than $b_2$, form difference convolution kernel $k_{12}$ according to Equation (8) and then select the difference convolution kernel; if motion blur kernel $b_2$ corresponds to a smaller amount of motion blur than $b_1$, then form difference convolution kernel $k_{21}$ according to Equation (9) and then select the difference convolution kernel.

Embodiment 5

Figure 9:
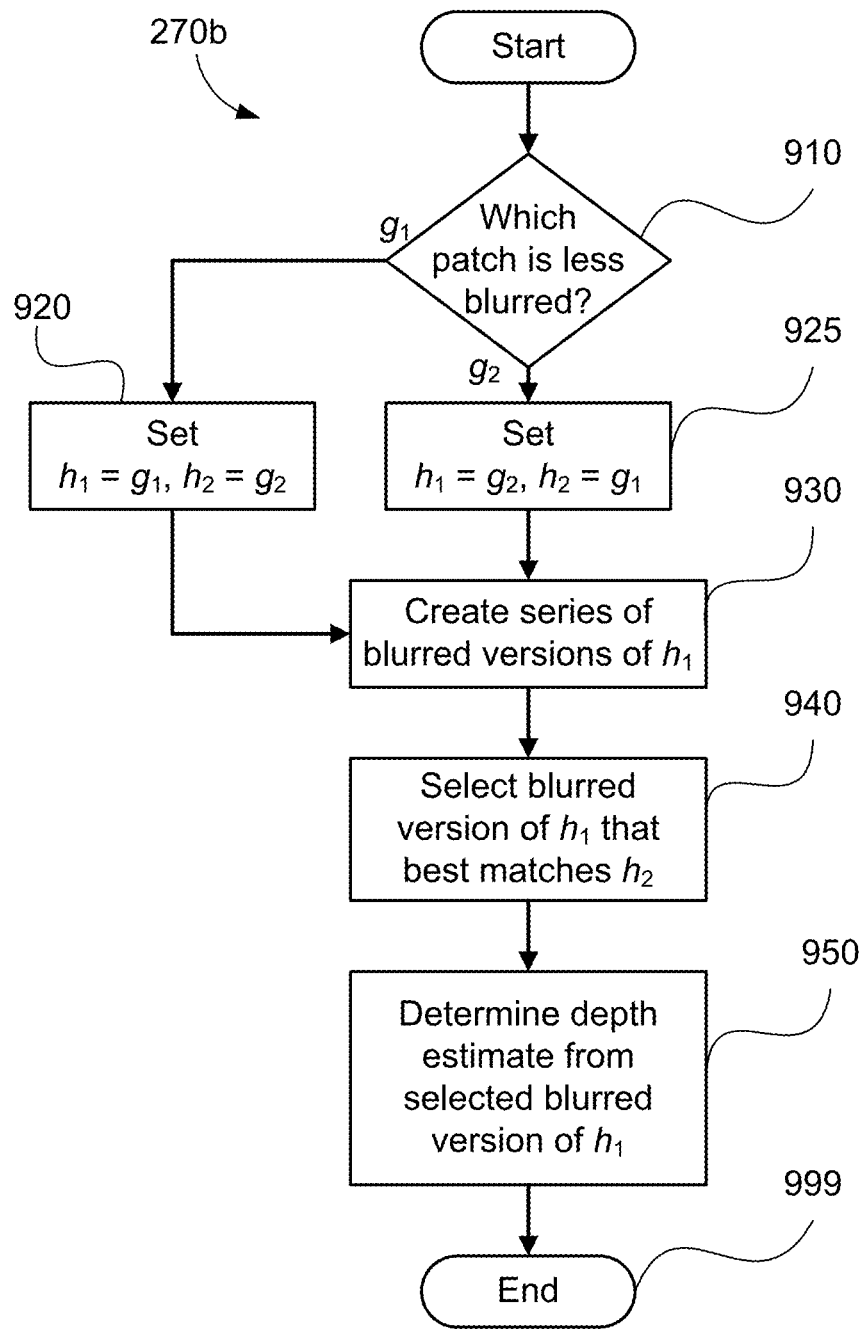
FIG. 9 is a schematic flow diagram illustrating a method of estimating depth from two image patches as used in the method of FIG. 2 according to a further embodiment of the invention.

An alternative embodiment of first depth estimation step 270 is now described with reference to FIG. 9. The depth estimation process 270b begins with an input patch $g_1$ and an input patch $g_2$ as data inputs. In the case where the depth estimation process 270b implements the first depth estimation step 270, $g_1$ is equal to the modified patch $f_1'$ and $g_2$ is equal to the image patch $f_2$ 350. The depth estimation process 270b may also implement the second depth estimation step 275, in which case $g_1$ is equal to the image patch $f_1$ 340 and $g_2$ is equal to the modified patch $f_2'$.

In a blur determination step 910, one of the input patches $g_1$ or $g_2$ is selected as a less blurred patch. This selection may be performed, for example, by calculating the standard deviations of the pixel values in each of the input patches $g_1$ or $g_2$ respectively and then comparing the standard deviations. The image patch $g_1$ or $g_2$ which has the higher standard deviation may then be selected as the less blurred patch; in the case where the standard deviations are equal, either may be selected. If the image patch $g_1$ is selected as the less blurred patch, the depth estimation process 270b continues to a first assignment step 920. On the other hand, if the image patch $g_2$ is selected as the less blurred patch, the depth estimation process 270b continues to a second assignment step 925.

In a first assignment step 920, the input patch $g_1$ is designated as $h_1$ and the second input patch $g_2$ is designated as $h_2$. In a second assignment step 925, the input patch $g_2$ is designated as $h_1$ and the second input patch $g_1$ is designated as $h_2$. From steps 920 and 925, processing continues at step 930.

In a blur series creating step 930, a series of blurred versions of $h_1$ are generated. This may be done, for example, by convolving $h_1$ with a series of Gaussian blur kernels of different widths. The goal is to find a blur kernel which when convolved with the patch $h_1$ most closely approximates the pixel values in patch $h_2$. Accordingly, the series of Gaussian blur kernels widths should be selected to cover a likely range of suitable widths.

In a blur matching step 940, the blurred version of $h_1$ from the series of blurred versions of $h_1$ which best matches the pixel values of patch $h_2$ is selected. This may be done, for example, by forming a series of difference patches by subtracting the patch $h_2$ from each path in the series of blurred versions of $h_1$, and then selecting the difference patch with the smallest absolute mean pixel value. Alternatively, the difference patch with the smallest root-mean-square pixel value may be selected. Other selection methods are possible.

In a depth determination step 950, the blurred version of $h_1$ selected in blur matching step 940 is used to determine a depth estimate for the input patches $g_1$ and $g_2$, which are in turn derived from image patches A 340 and $f_2$ 350. This depth estimation can be done using the set of image capture device parameters used to capture the images and either using a theoretical model relating the difference in defocus blur between $f_1$ and $f_2$ to the depth of the object 360 in the scene shown in the image patches for the image capture device parameters, or by reference to a calibration look-up table which lists depth versus difference in defocus blur for the image capture device parameters. The calibration look-up table may be assembled using either theoretical or experimental results. For example, a theoretical calibration can be compiled by simulating the OTF for a range of object distances and image capture device parameters, calculating the resulting difference in defocus blur for a range of object distances and image capture device parameters, determining a substantially equivalent Gaussian blur kernel width from the resulting difference in blur, and storing the equivalent Gaussian blur kernel width in a look-up table. Then the closest match between the look-up table values and the Gaussian blur kernel width of the best matching blurred versions of $h_1$ determined in blur matching step 940 can be used as an estimate of the depth to the object 360 shown in the image patches.

In another example of depth determination step 950, an experimental calibration can be compiled by placing an object at a range of different distances from an image capture device, taking two photos of the object at each position with different camera parameters, calculating the difference in defocus blur of image patches showing the object, determining a substantially equivalent Gaussian blur kernel width from the resulting difference in blur, and storing the equivalent Gaussian blur kernel width in a look-up table referenced by distance to the object.

The depth estimation process 270b then ends at end step 999.

Further alternative embodiments of the depth estimation steps 270 and 275 are possible, including other known methods of estimating depth from two corresponding image patches such as input image patches $f_1$ 340 and $f_2$ 350.

Embodiment 6

Figure 10:
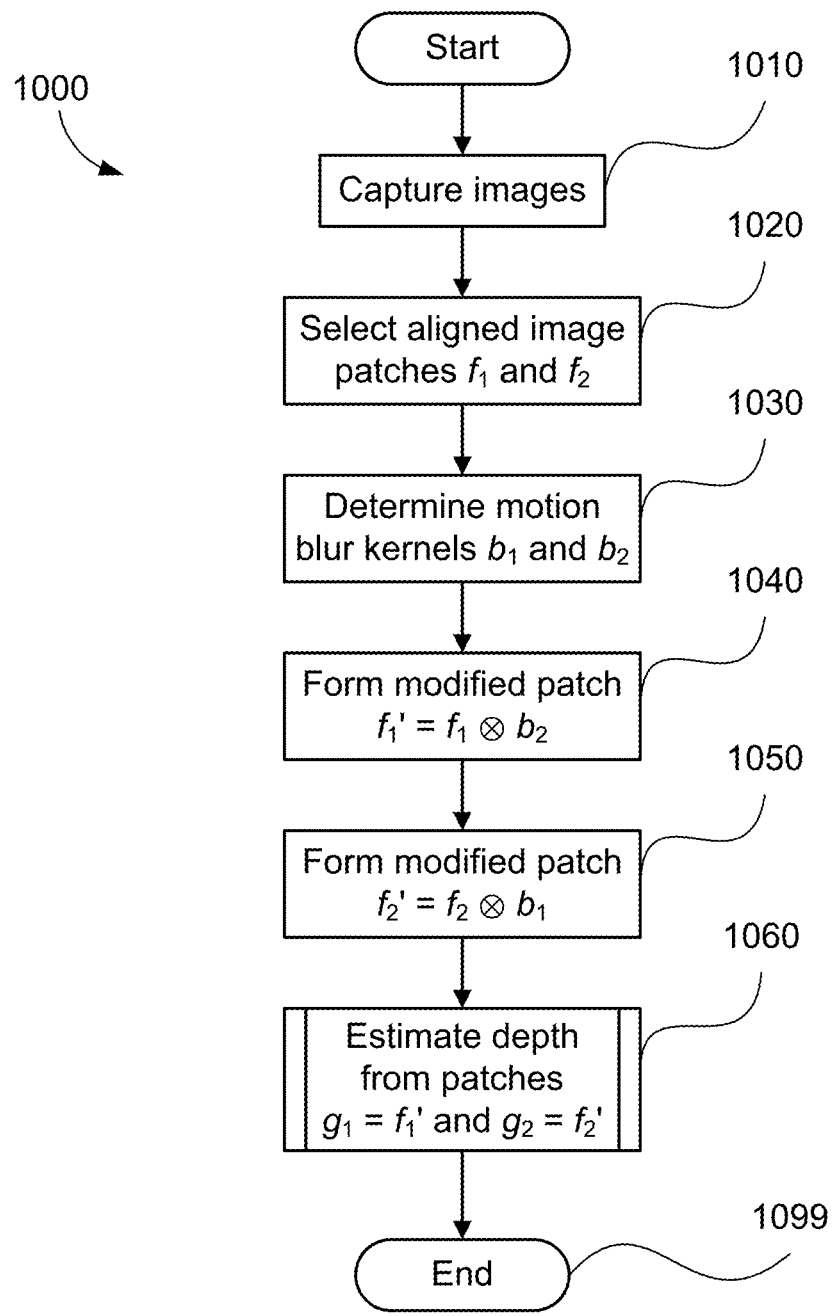
FIG. 10 is a schematic flow diagram illustrating a method of estimating depth of an object from a digital image of a scene according to another embodiment of the invention.

A further embodiment is described hereinafter with reference to FIG. 10. A depth estimation process 1000 begins with an image capture step 1010, in which two or more images of a scene are captured by an image capture device such as the camera 127. From the two or more images, two images 300 and 310 are selected. The images 300 and 310 preferentially capture common parts of the scene. The images 300 and 310 preferentially are captured with different settings of image capture device parameters that affect the amount of lens blur, such as focus, aperture, or zoom.

In a patch selection step 1020, image patches $f_1$ 340 and $f_2$ 350 are selected from the two images 300 and 310 such that corresponding pixels 320 and 330 in the image patches 340 and 350 respectively substantially represent the same point in the scene being imaged. This may be achieved by locally aligning the two images using a method such as optical flow or correlation-based alignment.

In a motion blur kernel determination step 1030, the motion blur kernels $b_1$ and $b_2$ present in the image patches $f_1$ 340 and $f_2$ 350 respectively are determined. This may be done using an image-based motion blur estimation algorithm, operating on each of the images 300 and 310. Several such methods are known, as mentioned above. Alternatively, at least part of the motion blur may be estimated from known motion of the image capture device, such as in panning or tracking shots where the camera motion is recorded or computer-controlled. Alternatively, at least part of the motion blur may be estimated from a series of image frames, from which the speed and direction of motion of objects in the scene can be determined using optical flow and used to predict motion blur of an object.

In a first patch modification step 1040, a modified patch $f_1'$ is formed by convolving patch $f_1$ 340 with kernel $b_2$. In a second patch modification step 1050, a modified patch $f_2'$ is formed by convolving patch $f_2$ 350 with kernel $b_1$. In a depth estimation step 1070, a depth is estimated from the modified patch $f_1'$ and the modified patch $f_2'$. One method of estimating depth from the patches is described in detail above with reference to FIG. 5. The depth estimation process 200 then ends at an end step 299.

Example(s)/User Cases(s)

In an example use of the depth estimating method, a depth map of a scene may be determined In this example, depth estimation is practised on the input images 300 and 310 on a patch by patch basis by iterating the steps 220 to 299 of the depth estimation process 200, selecting successive pairs of aligned image patches $f_1$ 340 and $f_2$ 350 in patch selection step 220, such that the set of selected patches substantially covers the common parts of the scene captured by the input images 300 and 310. For example, the patches may be selected by iterating across rows and then down columns of the first input image 300 to select successive instances of image patch $f_1$ 340, and then selecting a suitable locally aligned image patch $f_2$ 350 from the second input image 310, as described in patch selection step 220. If no suitable locally aligned image patch $f_2$ 350 from the second input image 310 is available, for example if the image patch $f_1$ 340 depicts an object which has moved outside the view of the second input image 310, the image patch $f_1$ 340 may be skipped.

After depth estimates have been determined for the successive pairs of aligned image patches $f_1$ 340 and $f_2$ 350 by iterating the steps 220 to 299 for each of the successive pairs of patches, the resulting depth estimates may then be assembled into a depth map of the scene. For example, if the image patches were selected by iterating across rows and then down columns of the first input image 300, the depth estimates for each patch may be assembled in a corresponding fashion, iterating across rows and down columns to form a depth map of the scene.

INDUSTRIAL APPLICABILITY

The arrangements described are applicable to the computer and data processing industries and particularly for the determining depth measurements in imaging systems. The foregoing describes only some embodiments of the present invention, and modifications and/or changes can be made thereto without departing from the scope and spirit of the invention, the embodiments being illustrative and not restrictive.

We claim:

1. A method of determining a depth measurement of a scene using an optical blur difference between two images of the scene, each image being captured using an image capture device with different image capture device parameters, the method comprising:
   identifying a corresponding image patch from each of the captured images, motion blur being present in each of the image patches and the corresponding image patch for each of the captured images being at least a portion of the respective captured image of each of the captured images;
   determining a kernel of the motion blur in each of the image patches, the kernel of the motion blur in at least one of the image patches being used to generate a difference convolution kernel;
   convolving a selected first image patch with the generated difference convolution kernel to generate a modified image patch; and
   determining a depth measurement of the scene from an optical blur difference between the modified image patch and the remaining image patch.

2. The method as claimed in claim 1, further comprising selecting the first image patch based on the motion blur kernel in the image patch.

3. The method as claimed in claim 1, wherein the motion blur present in the modified image patch substantially matches the motion blur present in the remaining image patch.

4. The method as claimed in claim 1, wherein the generated difference convolution kernel is a first difference convolution kernel, the method further comprising generating a second difference convolution kernel, and the remaining image patch is convolved with the second difference convolution kernel to form another modified image patch.

5. The method as claimed in claim 4, wherein the motion blur present in both modified image patches is substantially the same.

6. The method as claimed in claim 4, wherein the generated first difference convolution kernel is equal to the determined motion blur kernel in the remaining image patch.

7. The method as claimed in claim 4, wherein the generated second difference convolution kernel is equal to the determined motion blur kernel in the selected image patch and is convolved with the remaining image patch to form another modified image patch.

8. The method as claimed in claim 1, wherein the exposure times of the captured images are the same.

9. The method as claimed in claim 1, wherein a second pair of corresponding image patches is processed differently to the first pair of corresponding image patches.

10. The method as claimed in claim 1, wherein the selected image patch is determined to have a smaller motion blur kernel than that of the remaining image patch.

11. The method as claimed in claim 1, wherein the remaining image patch is determined to have a smaller motion blur kernel than that of the selected image patch.

12. The method as claimed in claim 10, further comprising determining the smaller motion blur kernel by counting the number of samples above an amplitude threshold in Fourier differences.

13. The method as claimed in claim 12, further comprising applying a logarithm to the amplitudes of the Fourier differences.

14. The method as claimed in claim 12, further comprising weighting the Fourier differences.

15. The method as claimed in claim 10, further comprising determining the smaller motion blur kernel by comparing widths of one-dimensional motion blur kernels.

16. The method as claimed in claim 1, further comprising forming a spectral ratio using Fourier differences.

17. The method as claimed in claim 16, further comprising weighting the spectral ratio using a Fourier difference amplitude threshold.

18. The method as claimed in claim 1, further comprising forming a depth map using the depth measurement.

19. An apparatus for determining a depth measurement of a scene using an optical blur difference between two images of the scene, each image being captured using an image capture device with different image capture device parameters, the apparatus comprising:
   a memory for storing data and a computer program; and
   at least one processor coupled to the memory for executing a computer program, the memory and the at least one processor configured to determine the depth measurement of the scene using the optical blur difference, the at least one processor operating to:
      identify a corresponding image patch from each of the captured images, motion blur being present in each of the image patches and the corresponding image patch for each of the captured images being at least a portion of the respective captured image of each of the captured images;
      determine a kernel of the motion blur in each of the image patches, the kernel of the motion blur in at least one of the image patches being used to generate a difference convolution kernel;
      convolve a selected first image patch with the generated difference convolution kernel to generate a modified image patch; and
      determine a depth measurement of the scene from an optical blur difference between the modified image patch and the remaining image patch.

20. A non-transitory computer readable storage medium having recorded therein a computer program for causing a computer to execute a method for determining a depth measurement of a scene using an optical blur difference between two images of the scene, each image being captured using an image capture device with different image capture device parameters, the method comprising:
   identifying a corresponding image patch from each of the captured images, motion blur being present in each of the image patches and the corresponding image patch for each of the captured images being at least a portion of the respective captured image of each of the captured images;
   determining a kernel of the motion blur in each of the image patches, the kernel of the motion blur in at least one of the image patches being used to generate a difference convolution kernel;
   convolving a selected first image patch with the generated difference convolution kernel to generate a modified image patch; and
   determining a depth measurement of the scene from an optical blur difference between the modified image patch and the remaining image patch.

21. The method as claimed in claim 4, further comprising estimating or determining the depth measurement of the scene from an optical blur difference between the another modified image patch and the first selected image patch.

22. The method as claimed in claim 1, wherein the kernel of the motion blur and the difference convolution kernel are different from each other.

23. The method as claimed in claim 1, wherein the difference convolution kernel is generated using the kernels of the motion blur of both corresponding image patches.

24. The method as claimed in claim 23, wherein the difference convolution kernel is generated by performing a Fourier Transform on at least one of the kernels of the motion blur.

25. The method as claimed in claim 1, wherein the determining step determines the kernel of the motion blur for each of the two image patches, the kernels of the motion blur being used to generate two difference convolution kernels, and wherein one of the two generated difference convolution kernels is used in the convolving step to generate the modified image patch based on which of the two generated difference convolution kernels tends to increase a noise in an image by less than the other of the two generated difference convolution kernels when convolved with a noisy image.

\* \* \* \* \*